United States Patent [19]

Kauffman et al.

[11] Patent Number: 4,522,723

[45] Date of Patent: Jun. 11, 1985

[54] PROCESS FOR THE REMOVAL AND RECOVERY OF HEAVY METALS FROM AQUEOUS SOLUTIONS

[75] Inventors: Jim W. Kauffman; William C. Laughlin, both of Edmond, Okla.

[73] Assignee: Kerr-McGee Corporation, Oklahoma City, Okla.

[21] Appl. No.: 616,415

[22] Filed: Jun. 1, 1984

[51] Int. Cl.$^3$ .............................................. C02F 3/34
[52] U.S. Cl. .................................... 210/611; 210/616; 210/912
[58] Field of Search ............... 210/610, 611, 912, 913, 210/615–618

[56] References Cited

U.S. PATENT DOCUMENTS

| | | | |
|---|---|---|---|
| 4,108,722 | 8/1978 | Stover | 423/17 X |
| 4,124,501 | 11/1978 | Yen et al. | 210/611 X |
| 4,200,523 | 4/1980 | Balmat | 210/611 |
| 4,332,904 | 6/1982 | Kurane et al. | 210/611 X |
| 4,354,937 | 10/1982 | Hallberg | 210/607 |

Primary Examiner—Thomas Wyse
Attorney, Agent, or Firm—William G. Addison; John P. Ward

[57] ABSTRACT

A process is provided for reducing the concentration of water soluble ionic heavy metal species and sulfate ions in aqueous waste solutions containing the same. The process comprises passing said waste solution through a treatment zone containing a porous matrix on which are retained populations of at least one bacteria of the genera Desulfovibrio and Desulfotomaculum. The passing of said aqueous solution through said treatment zone is carried out at predetermined rates of flow, and contact between said solution and said bacteria is conducted under anaerobic conditions and at predetermined pH and temperature levels. The process provides for the conversion of the water soluble sulfate ions to hydrogen sulfide and reaction between said hydrogen sulfide and water soluble ionic heavy metal species to water insoluble heavy metal species which are substantially retained on the porous matrix and which are recoverable therefrom.

18 Claims, No Drawings

PROCESS FOR THE REMOVAL AND RECOVERY OF HEAVY METALS FROM AQUEOUS SOLUTIONS

CROSS-REFERENCE TO RELATED APPLICATIONS

Aspects of the present invention are related to subject matter disclosed in co-pending applications entitled "PROCESS FOR THE REMOVAL OF SULFATE AND METALS FROM AQUEOUS SOLUTIONS", Ser. No. 616,416, and "PROCESS FOR THE REMOVAL AND RECOVERY OF SELENIUM FROM AQUEOUS SOLUTIONS", Ser. No. 616,417, both co-pending applications filed on an even date herewith and both assigned to the same assignee as the present invention.

FIELD OF THE INVENTION

The present invention relates to a process for reducing the concentration of water soluble ionic heavy metal species in aqueous solutions containing sulfate ions. More particularly, the present invention relates to a process for the removal of heavy metals from aqueous waste streams such as spent leaching solutions or mine discharge waters prior to the discarding of such streams into, for example, the groundwater system and the recovery of said heavy metals as their sulfides, oxides and other water insoluble reduced species.

BACKGROUND OF THE INVENTION

Each year tens of millions of gallons and more of contaminated aqueous solutions are discharged as industrial wastes. These solutions contain a variety of contaminants including heavy metals and sulfates, substances which are objectionable from an environmental standpoint. Typical examples of industries which generate and discharge waste solutions containing contaminants such as the above mentioned heavy metals and sulfates include the chemical, metal processing and mining industries.

Due to the real as well as the potential adverse impact that such contaminants as heavy metals and sulfates do and can have on man and environment, both federal and state agencies have promulgated and put into force numerous regulations establishing maximum concentration levels for these contaminants in industrial waste solutions discharged into our groundwater systems.

In order to comply with these regulations, a number of processes have been used or are now undergoing testing and development to effect removal of various contaminants, including the removal of heavy metals. Such processes include gravity sedimentation, flotation, filtration, ion exchange, activated adsorption, reverse osmosis, electrodialysis, distillation and chemical precipitation. However, many of these processes are not ideally suited to treat large volumes of water or are excessively expensive to install and operate in comparison with their overall efficiency and effectiveness.

In addition to the above processes, various biological processes are known for specifically removing heavy metals and sulfates from waste water solutions. In such processes, sulfate reducing bacteria are employed to reduce the sulfates to hydrogen sulfide which in turn reacts with the heavy metals to form water insoluble heavy metal sulfides which precipitate out of solution. Typical examples of known biological processes for removing heavy metal and sulfate contaminants from byproduct aqueous waste streams or solutions are described in U.S. Pat. No. 4,354,937 and U.S. Pat. No. 4,108,722.

Drawbacks to the use of such biological processes, however, also are well known. These include, to illustrate but a few, the production of metabolic wastes which in and of themselves represent real or potential pollution problems and the formation of finely crystalline sulfide precipitates the removal of which, by sedimentation or filtration, is extremely difficult.

SUMMARY OF THE INVENTION

The surprising discovery now has been made that through the practice of the present invention, as described in greater detail hereinafter, it is possible to substantially reduce the concentration of ionic heavy metal species in aqueous solutions containing sulfate ions by contacting the aqueous solutions with a population of bacteria, contained on a porous matrix, said bacteria being capable of metabolically reducing the sulfate ions to hydrogen sulfide which in turn reacts with the water soluble ionic heavy metal species to form water insoluble heavy metal species, including sulfides, oxides and other water insoluble reduced forms of said heavy metals. The water insoluble heavy metal species separate from the aqueous solution and substantially are retained on the porous matrix. The resultant aqueous effluent is characterized by significantly lower concentrations of both water soluble ionic heavy metal species and sulfates. Furthermore, said heavy metal sulfides can be recovered from said porous matrix.

The contacting of the aqueous solutions containing water soluble ionic heavy metal species and sulfate ions with the sulfate reducing bacteria contained on the porous matrix is carried out under anaerobic conditions and in the presence of nutrients and at temperatures capable of providing for the continued growth and steady state population density of the bacteria.

DETAILED DESCRIPTION OF THE INVENTION

In accordance with the present invention, a process for substantially removing water soluble ionic heavy metal species from aqueous solutions containing sulfate ions is provided. Aqueous solutions which can be treated in accordance with the process of this invention can include any process effluent such as, for example, water from uranium mining and leaching operations, mine seepage or drainage waters and any other aqueous streams which contain such ionic heavy metal species and sulfate ions. To facilitate the description and understanding of the process of the present invention, specific reference hereinafter will be made to aqueous solutions comprising mine discharge waters, wherein such ionic heavy metals impurities and sulfate ions are present.

In accordance with the process of the present invention, a mine discharge water is introduced into a treatment zone, wherein there is provided a porous matrix containing populations of anaerobic bacteria selected from the group consisting of bacteria of the genera Desulfovibrio and Desulfotomaculum through which matrix the mine discharge water must pass. These families of anaerobic bacteria include the species *D. desulfuricanus, D. africans, D. gigas, D. salexigens, D. vulgaris* and the like, and various subspecies thereof. Bacteria of the genus Desulfovibrio are the preferred bacteria for use in the process of the present invention.

The treatment zone can be any suitable structure, representative but non-limiting examples of which include various vessels, tanks and earthen ponds. Within this treatment zone, the porous matrix contained therein will be under anaerobic conditions, i.e., substantially free of atmospheric oxygen. Under such anaerobic conditions, the Desulfovibrio or Desulfotomaculum bacteria, contained on the porous matrix, metabolically reduce the sulfate ions to hydrogen sulfide which then reacts with the water soluble ionic heavy metal species to form water insoluble particulate heavy metal species. These particulate heavy metal species which include, for example, water insoluble sulfides, oxides and other water insoluble reduced forms of said heavy metals substantially are retained on the porous matrix. As a result of the metabolic reduction of the sulfate ions to hydrogen sulfide and the subsequent reaction thereof with the ionic heavy metal species to form water insoluble particulate heavy metal species, the effluent exiting the treatment zone contains significantly reduced concentrations of water soluble ionic heavy metal species and sulfate ions compared to the concentrations of these species in the mine discharge water entering said treatment zone.

Various materials can be employed as the porous matrix support for the Desulfovibrio or Desulfotomaculum bacteria within the treatment zone. To be useful, these materials must at least possess a porosity capable of allowing passage of the mine discharge water through the treatment zone at rates of flow within the ranges set forth hereinbelow and also must be substantially inert, i.e., neither destroy the bacteria per se nor interfere with said bacteria's ability to metabolically reduce the water soluble sulfate ions to hydrogen sulfide and the reactions between said hydrogen sulfide and ionic heavy metal species. Representative, but non-limiting, examples of such materials include soil, sand, cellulose, glass wool, glass beads and the like. Combinations of these various materials also can be used. Preferred materials for use as the porous matrix in the practice of the invention are soil and sand and combinations thereof. If the material employed as the porous matrix, e.g., glass wool, does not initially contain Desulfovibrio or Desulfotomaculum bacteria it will be necessary to first inoculate this material with said bacteria and establish suitable population densities of said bacteria on the matrix material prior to commencement of treatment of the mine discharge water. This can be accomplished by loading the treatment zone with the matrix material, adding a suitable quantity of a culture of the bacteria to the matrix material and maintaining the matrix material under anaerobic conditions.

The pH of the mine discharge water entering the treatment zone, the rate of flow of the mine discharge water through said treatment zone, the presence of nutrients in said treatment zone and the temperature of the combination of the mine water and porous matrix within said zone are all parameters critical to carrying out the process of this invention. In general, the pH of the mine water entering the treatment zone must be at least about 6.0 and generally will range from about 6 to about 11 and preferably from about 7.0 to about 10.0. Within this pH range, the sulfate ions will readily undergo reduction to hydrogen sulfide and in turn said hydrogen sulfide readily will react with the water soluble ionic heavy metal species in the mine water to produce water insoluble particulate heavy metal species. If adjustment of the pH of the mine discharge water or the environment within the treatment zone is necessary, this can be accomplished by the addition of a suitable acidic or alkaline material such as sulfuric acid, lime, caustic and the like to either the mine water or the treatment zone or both.

For any given rate of flow of the mine discharge water through the porous matrix, the extent of removal of ionic heavy metal species from the mine discharge water, through the metabolic reduction of sulfate ions to hydrogen sulfide and subsequent reaction thereof with the soluble heavy metal species to form water insoluble heavy metal species, is dependent on the amount of nutrient available to the Desulfovibrio or Desulfotomaculum bacteria, contained on the porous matrix, for growth and establishment of sufficiently large population densities. For example, as the amount of nutrient available to the bacteria for growth and the establishment of large population densities increases, the extent of heavy metal species removal from the mine waters contacted with said bacteria also increases. Conversely, as the amount of nutrient decreases, the growth and population densities of the bacteria, contained on the porous matrix, decreases, resulting in a concomitant decrease in the amount of the water soluble heavy metal species which can be removed from the mine water.

The presence of nutrients in the mine water/porous matrix environment within the treatment zone serves to provide the energy and other materials necessary for cell growth. Thus, the capacity of the bacteria to grow and maintain steady state population densities within the porous matrix is determined by said bacteria's ability to utilize the particular nutrients, including trace nutrients, present in the bacteria's surroundings. For bacteria of the genera Desulfovibrio and Desulfotomaculum, nutrients having the ability to provide for the growth and steady state population densities thereof include any organic material capable of acting as a carbon source. Representative, but non-limiting, examples of such organic materials include starches, sugars, organic acids and biological and municipal waste water sludges and the like and waste byproducts resulting from the metabolic reduction of such organic materials as cellulose, hemicellulose, pectic substances, inulin, chitin, lignin, proteins, amino acids, hydrocarbons and the like, including derivatives of these organic materials, by other bacterial organisms. Of these organic materials, starches, municipal waste water sludges, sugars such as sucrose and glucose and waste byproducts resulting from the metabolic reduction of organic materials such as those listed above are the preferred materials to be employed as nutrients in the process of this invention. Trace nutrients, necessary to the bacteria's growth, including, for example, nitrogen, phosphorous, potassium, magnesium, sulfur, iron, calcium, manganese, zinc, copper, molybdenum, cobalt and other bacteria growth factors such as, for example, vitamins, will be added to the mine water/porous matrix environment within the treatment zone. Such trace nutrients can occur naturally within the material employed as the porous matrix or the mine discharge water being treated or both. In such event, external addition of such trace nutrients will generally be unnecessary.

The amount of nutrient added to the mine water/porous matrix environment within the treatment zone will be an amount capable of providing for a rate of growth and the maintenance of steady state population densities of said Desulfovibrio or Desulfotomaculum bacteria sufficient to yield an aqueous effluent having predetermined, reduced concentrations of the sulfate and heavy metal ions therein. Generally, said predetermined, reduced concentrations of sulfate and heavy metal ions correspond to at least the maximum concentration levels for such ions in the discharge effluents as established by either federal or state regulatory agencies for the locale in which said discharge is taking place. For example, in the state of New Mexico, the maximum concentration levels for sulfate, uranium and molybdenum contaminants in mining or ore processing waste waters are 600, 5.0 and 1.0 milligrams of said contaminants, respectively, per liter of such waste waters. Thus, in the biological treatment of such waste waters, in accordance with the process of this invention, sufficient nutrient will be added, as needed, to the mine water/porous matrix environment in the treatment zone for the growth and establishment of populations of Desulfovibrio or Desulfotomaculum bacteria to yield an effluent containing, at most, these maximum concentration levels. Determination of the need for and amount of nutrient to accomplish the above purposes readily can be made by analysis of the mine water entering the treatment zone and the effluent exiting the treatment zone for sulfate and heavy metal e.g., uranium and molybdenum, ion contents. An increase in the concentration of any of these ions in the effluent stream exiting the treatment zone above the predetermined, maximum concentration levels for such ions will indicate the need for additional nutrient to re-establish the growth and population densities of the Desulfovibrio or Desulfotomaculum bacteria contained on the porous maxtrix within the treatment zone. Nutrient will be added to the waste waters entering the treatment zone or to the treatment zone itself until such time as at least the predetermined, maximum concentration levels for all of the contaminant ions in the effluent exiting the treatment zone once again have been achieved.

Although the above teachings relate to an intermittent addition of nutrient to the treatment zone to provide the necessary energy for the growth and establishment of large steady state population densities of the Desulfovibrio or Desulfotomaculum bacteria therein, such addition may be carried out on a continuous basis. In such event, only periodic analysis of the effluent stream exiting the treatment zone need be made to determine that the necessary growth and population densities of the bacteria are being maintained for substantial removal of the heavy metal and sulfate contaminants.

The treatment zone, in which the mine water to be treated and the porous matrix containing the Desulfovibrio or Desulfotomaculum bacteria are retained, will be maintained at temperatures ranging from about 0° C. to about 65° C. and, preferably, at temperatures from about 0° C. to about 35° C. and most preferably at temperatures ranging from about 12° C. to about 35° C. This range of temperatures is critical for optimizing the growth and population densities of the Desulfovibrio or Desulfotomaculum bacteria and, thus, optimization of the extent of water soluble heavy metal and sulfate ions removal. Although decreased heavy metal and sulfate ions removal has been observed when operating at the lower end of the above indicated broad temperature range, it has been further observed that the amount of available nutrient in the treatment zone is interrelated with the extent of heavy metals and sulfate ions removal. Thus, even at the lower end of the above broad temperature range, heavy metals and sulfate ions removal can be increased by providing an ample supply of nutrient to the treatment zone.

The rate of flow of the mine water into and through the treatment zone containing the porous matrix and Desulfovibrio or Desulfotomaculum bacteria can range up to about 820.0 liters of said mine water per square meter of the porous matrix in said zone per day. In a preferred embodiment, this rate of flow will range from about 86.0 to about 270.0 liters of mine water per square meter of the porous matrix per day. At or within these flow rates, it has been observed that the sulfate ions in the mine water being treated will have sufficient time to make contact with the bacteria on the porous matrix and, thereby, undergo metabolic reduction to hydrogen sulfide. In turn these flow rates permit reaction of the hydrogen sulfide so produced with the ionic heavy metal species in the mine water to form insoluble particulate heavy metal species. These water insoluble heavy metal species precipitate from solution and are filtered out by and substantially retained on the porous matrix leaving a purified aqueous effluent.

The ionic heavy metal species which can be removed from the mine discharge waters in accordance with this invention are those wherein the metal component thereof is at least one metal selected from the group consisting of metals of Groups IB, IIB, IVB, VA, VIB, VIII and the Actinide Series of the Periodic Table of Elements. Representative examples of metals in these various Groups include silver, copper, zinc, mercury, cadmium, lead, tin, bismuth, antimony, molybdenum, cobalt, nickel, iron, thorium, uranium and the like.

The water insoluble heavy metal species, resulting from the metabolic reduction of water soluble sulfate ions in the mine discharge water to hydrogen sulfide and the reaction thereof with the water soluble ionic heavy metal species in said water, substantially retained on the porous matrix can be separated therefrom and recovered as such or utilized in the manufacture of various other valuable heavy metal compounds. One method for separating the water insoluble heavy metal species from the matrix is to elutriate said matrix with an aqueous solution such as, for example, water or effluent previously recovered from the treatment zone. Elutriation of the porous matrix to remove the water insoluble heavy metal species preferable will be carried out within the treatment zone for a time sufficient to remove substantially all of the water insoluble heavy metal species from the porous matrix within said zone. The rate of flow of the aqueous solution through the treatment zone will be a rate sufficient to elutriate the heavy metal species from the porous matrix without substantially removing the matrix itself from said zone. The water insoluble heavy metal species, contained in the eluate, can be recovered from said eluate by such means as flotation, filtration and the like.

The following non-limiting examples are presented as being illustrative of the practice of the present invention. In these examples, all parts are by weight unless indicated otherwise.

EXAMPLE I

To a vertically positioned cylindrical vessel having a diameter of three feet and equipped with inlet and outlet means is added approximately 1,633 kilograms of a 50/50 (wt/wt) sand and soil mixture, said soil containing naturally occurring populations of Desulfovibrio bacteria. This mixture provides a porous matrix within the vessel of about five feet in depth. An aqueous stream, from a mining operation, continuously is introduced to the top of the vessel through the inlet means provided therein. This stream contains substantial concentrations of water soluble sulfate ($SO_4^{-2}$), uranium (U) and molybdenum (Mo) contaminants. This aqueous stream is percolated downwardly through the vessel and matrix of mixed sand and soil and is removed, as effluent, from the bottom of the vessel through the outlet means therein. The continuous introduction of the aqueous stream to and removal of the effluent from the vessel is continued for a period of 161 days.

The solution pH of the aqueous stream passing through the vessel is about 8.0. The rates of flow of the aqueous stream through the vessel and the temperatures within the vessel during this period range from about 79.0 to about 163.0 liters per square meter of the matrix per day and from about 14° C. to about 21° C., respectively. Intermittent addition of a quantity of sucrose sufficient to provide a concentration of about 0.7 grams of sucrose per liter of said stream in the vessel is commenced on the 70th day of operation. Beginning on the 105th day of operation continuous addition of sucrose to the aqueous stream in the space above the mixed sand and soil matrix in the vessel, to maintain therein a concentration of about 0.7 grams of sucrose per liter of said stream, is commenced. During this operational period, analysis is made of the aqueous stream entering said vessel and the effluent exiting said vessel to determine the concentrations of water soluble sulfate, uranium and molybdenum ions therein, respectively. Data relating to this Example are provided in the Table below.

TABLE

| Days of Operation | U Conc. mg/l Inlet | U Conc. mg/l Outlet | $SO_4^{-2}$ Conc. mg/l Inlet | $SO_4^{-2}$ Conc. mg/l Outlet | Mo Conc. mg/l Inlet | Mo Conc. mg/l Outlet |
|---|---|---|---|---|---|---|
| 13 | 0.49 | 0.75 | 780 | 970 | 0.600 | 0.600 |
| 49 | 0.61 | 0.56 | 850 | 960 | 0.680 | 0.780 |
| 70[a] | 0.85 | 0.76 | 960 | 940 | 0.630 | 0.830 |
| 105[b] | 0.94 | 1.00 | 800 | 700 | 0.450 | 0.270 |
| 133 | — | 0.050 | — | 520 | — | 0.046 |
| 161 | 0.330 | 0.070 | 950 | 520 | 0.680 | 0.031 |

[a] intermittent addition of sucrose commenced
[b] continuous addition of sucrose commenced While the invention herein has been described in terms of what at present are believed to be the preferred embodiments thereof, it is to be understood that this invention is not limited to these specific embodiments and that changes thereto can be made without departing from the spirit and scope thereof except as provided in the following claims.

What is claimed is:

1. A process for reducing the concentration of water soluble ionic heavy metal species in an aqueous solution containing the same comprising:
    providing an aqueous solution containing sulfate ions and water soluble ionic heavy metal species, said aqueous solution having a pH of at least about 6.0;
    providing a porous matrix containing a population of bacteria capable of reducing said sulfate ions to hydrogen sulfide wherein said population of bacteria comprises at least one anaerobic bacteria selected from the group consisting of bacteria of the genera, Desulfovibrio and Desulfotomaculum said matrix being under anaerobic conditions; and
    passing said aqueous solution through said porous matrix in the presence of nutrients and at predetermined temperatures, said nutrients and said temperatures providing for the growth and steady state population density of said bacteria, to contact the sulfate ions in said aqueous solution with the bacteria contained in the porous matrix whereby said bacteria metabolically reduce at least a portion of the sulfate ions to hydrogen sulfide which reacts with at least a portion of the water soluble ionic heavy metal species to form water insoluble heavy metal species which substantially are retained on the porous matrix, and to produce an aqueous effluent having a reduced concentration of said water soluble ionic heavy metal species.

2. The process of claim 1 wherein the metal components in the water soluble ionic heavy metal species in said aqueous solution are capable of reacting with hydrogen sulfide to form water insoluble heavy metal species.

3. The process of claim 1 wherein the pH of the aqueous solution containing said water soluble ionic heavy metal species ranges from about 6.0 to about 11.0.

4. The process of claim 1 wherein the population of bacteria comprises bacteria of the genus, Desulfovibrio.

5. The process of claim 1 wherein said aqueous solution is continuously passed through said porous matrix at a rate up to about 820.0 liters of the aqueous solution per square meter of the porous matrix per day.

6. The process of claim 5 wherein the passing of said aqueous solution through said porous matrix containing said bacteria is carried out in the presence of at least one nutrient capable of acting as a carbon source and selected from the group consisting of starches, sugars, organic acids, biological and municipal waste water sludges and waste byproducts, said waste byproducts resulting from the metabolic reduction of at least one organic material selected from the group consisting of cellulose, hemicellulose, pectic substances, inulin, chitin, lignin, proteins, amino acids, hydrocarbons and derivatives thereof and in the presence of at least one trace nutrient.

7. The process of claim 6 wherein the passing of said aqueous solution through said porous matrix containing said bacteria in the presence of said nutrients is carried out at a temperature ranging from about 0° C. to about 65° C.

8. The process of claim 5 further comprising continuously separating from said porous matrix an aqueous effluent containing a significantly reduced concentration of said water soluble ionic heavy metal species.

9. The process of claim 1 further comprising separating and recovering from said porous matrix said water insoluble heavy metal species.

10. A continuous process for reducing the concentration of water soluble heavy metal ions in an aqueous solution containing the same comprising:
    providing an aqueous waste solution containing sulfate ions and water soluble ionic heavy metal species capable of reacting with hydrogen sulfide to form water insoluble heavy metal species, said aqueous waste solution having a pH ranging from about 6 to about 11;
    providing a porous matrix containing a population of Desulfovibrio bacteria, said bacteria being capable of reducing said sulfate ions to hydrogen sulfide, said matrix being under anaerobic conditions;
    continuously passing said aqueous waste solution through said porous matrix at a rate up to about 820.0 liters of the aqueous waste solution per square meter of the porous matrix per day, in the presence of at least one nutrient capable of acting as a carbon source and selected from the group consisting of starches, sugars, organic acids, biological municipal waste water sludges and waste byproducts, said waste byproducts resulting from the metabolic reduction of at least one organic material selected from the group consisting of cellulose, hemicellulose, pectic substances, inulin, chitin, lignin, proteins, amino acids, hydrocarbons and derivatives thereof and in the presence of at least one trace nutrient and at temperatures ranging from about 0° C. to about 65° C. said nutrients and said temperatures providing for the growth and steady state population density of the bacteria in said matrix, to contact said sulfate ions with said Desulfovibrio bacteria and thereby metabolically reduce at least a portion of said sulfate ions to hydrogen sulfide which reacts with at least a portion of the water soluble ionic heavy metal species to form water insoluble heavy metal species, which substantially are retained on the porous matrix; and continuously separating from said porous matrix an aqueous effluent containing a reduced concentration of said water soluble ionic heavy metal species.

11. The process of claim 10 further comprising separating and recovery from said porous matrix said water insoluble heavy metal species.

12. The process of claim 10 wherein said aqueous solution is a mine discharge water.

13. The process of claim 12 wherein the pH of said mine discharge water ranges from about 7.0 to about 10.0.

14. The process of claim 12 wherein heavy metal components of the ionic heavy metal species in said discharge water are comprised of at least one metal, in an ionic state, selected from the group consisting of metals of Group Ib, IIB, IVB, VA, VIB, VIII and the Actinide Series of the Periodic Table for Elements.

15. The process of claim 10 wherein said porous matrix is comprised of at least a porous soil, said soil naturally containing a population of Desulfovibrio bacteria and said soil being contained in a treatment zone under anaerobic conditions.

16. The process of claim 15 wherein said aqueous solution is continuously passed through said porous matrix, contained in said treatment zone under anaerobic conditions, at a rate of flow ranging from about 86.0 to about 270.0 liters of aqueous solution per square meter of the porous matrix per day.

17. The process of claim 16 wherein the passing of said aqueous solution through said porous matrix in said treatment zone is carried out in the presence of at least one nutrient capable of acting as a carbon source and selected from the group consisting of sucrose, glucose, starch, municipal waste water sludges and waste byproducts from the metabolic reduction of cellulose and hemicellulose.

18. The process of claim 17 wherein the passing of said aqueous solution through said porous matrix in said treatment zone is carried out at a temperature ranging from about 0° C. to about 35° C. and preferably ranging from about 12° C. to about 35° C.

* * * * *